(12) United States Patent
Kremer et al.

(10) Patent No.: US 11,493,824 B2
(45) Date of Patent: Nov. 8, 2022

(54) SOLID STATE ELECTRICALLY VARIABLE-FOCAL LENGTH LENS

(71) Applicant: HRL Laboratories, LLC, Malibu, CA (US)

(72) Inventors: Richard Kremer, Ramona, CA (US); Kyung-Ah Son, Moorpark, CA (US); Jeong-Sun Moon, Moorpark, CA (US); Ryan G. Quarfoth, Los Angeles, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 17/190,031

(22) Filed: Mar. 2, 2021

(65) Prior Publication Data

US 2021/0364884 A1 Nov. 25, 2021
US 2022/0308419 A9 Sep. 29, 2022

Related U.S. Application Data

(60) Provisional application No. 63/027,844, filed on May 20, 2020, provisional application No. 63/027,847, (Continued)

(51) Int. Cl.
*G02F 1/29* (2006.01)

(52) U.S. Cl.
CPC .................... *G02F 1/294* (2021.01)

(58) Field of Classification Search
CPC .......... G02B 15/00; G02B 15/14; G02B 3/00; G02B 3/12; G02B 3/14; G02B 13/001;
(Continued)

(56) References Cited

U.S. PATENT DOCUMENTS

| 4,466,703 A | 8/1984 | Nishimoto |
| 6,373,620 B1 | 4/2002 | Wang |

(Continued)

FOREIGN PATENT DOCUMENTS

| CN | 106480413 A | 3/2017 |
| CN | 106756793 A | 5/2017 |

(Continued)

OTHER PUBLICATIONS

International Search Report and Written Opinion of the International Searching Authority from PCT/US2021/020544, dated Jun. 23, 2021.

(Continued)

*Primary Examiner* — Christopher Stanford
*Assistant Examiner* — Journey F Sumlar
(74) *Attorney, Agent, or Firm* — Ladas & Parry, LLP

(57) ABSTRACT

A solid state electrically variable focal length lens includes a plurality of concentric rings of electro-optical material, wherein the electro-optical material comprises any material of a class of hydrogen-doped phase-change metal oxide and wherein each respective concentric ring further includes a transparent resistive sheet on a first face of the respective concentric ring, wherein the transparent resistive sheet extends along the first face, and a first voltage coupled between a first end and a second end of the transparent resistive sheet, wherein the first voltage may be varied to select an optical beam deflection angle.

29 Claims, 13 Drawing Sheets

Related U.S. Application Data filed on May 20, 2020, provisional application No. 63/027,838, filed on May 20, 2020, provisional application No. 63/027,841, filed on May 20, 2020, provisional application No. 63/027,849, filed on May 20, 2020.

(58) Field of Classification Search
CPC .... G02B 13/0095; G02B 13/02; G02B 13/04; G02B 13/22; G02B 13/14; G02F 1/294; G02F 1/29; G02F 2202/00
See application file for complete search history.

(56) References Cited

U.S. PATENT DOCUMENTS

| | | |
|---|---|---|
| 7,312,917 B2 | 12/2007 | Jacob |
| 10,955,720 B2 | 3/2021 | Son et al. |
| 2005/0014033 A1 | 1/2005 | Cheung et al. |
| 2006/0050358 A1 | 3/2006 | Bigman |
| 2007/0053139 A1 | 3/2007 | Zhang et al. |
| 2007/0171504 A1 | 7/2007 | Fujimori |
| 2008/0212007 A1 | 9/2008 | Meredith |
| 2010/0309539 A1 | 12/2010 | Kaye |
| 2011/0038093 A1 | 2/2011 | Furukawa |
| 2013/0063805 A1* | 3/2013 | Arnold .............. G02B 3/14 359/311 |
| 2016/0170244 A1 | 6/2016 | Ho et al. |
| 2017/0031231 A1 | 2/2017 | Bhaskaran et al. |
| 2017/0054099 A1 | 2/2017 | Friend et al. |
| 2017/0113951 A1* | 4/2017 | Su .............. C02F 1/469 |
| 2018/0046056 A1 | 2/2018 | Na et al. |
| 2018/0059440 A1 | 3/2018 | Yu et al. |
| 2018/0158616 A1* | 6/2018 | Lazarev ............ H01G 4/01 |
| 2019/0129275 A1 | 5/2019 | On et al. |
| 2019/0278150 A1* | 9/2019 | Son .............. G02B 27/0977 |
| 2021/0363629 A1 | 11/2021 | Son et al. |
| 2021/0364881 A1 | 11/2021 | Kremer et al. |

FOREIGN PATENT DOCUMENTS

| | | |
|---|---|---|
| JP | 2007-147934 | 6/2007 |
| JP | 2016-050951 A | 4/2016 |
| JP | 2016050951 A | 4/2016 |
| KR | 10-2019-0092062 A | 8/2019 |
| KR | 20190092062 A | 8/2019 |
| KR | 20200029924 A | 3/2020 |

OTHER PUBLICATIONS

From U.S. Appl. No. 16/296,049 (now published as U.S. Pat. No. 10,955,720), Notice of Allowance mailed on Nov. 24, 2020.
From U.S. Appl. No. 16/296,049 (now published as U.S. Pat. No. 10,955,720), Office Action dated Aug. 14, 2020.
PCT International Preliminary Report on Patentability (Chapter II) for PCT/US2019/021233 dated Sep. 25, 2019.
PCT International Search Report for PCT/US2019/021233 dated Jun. 26, 2019.
PCT Written Opinion of the International Searching Authority for PCT/US2019/021233 dated Jun. 26, 2019.
Chung, S., et al., "A Monolithically Integrated Large-Scale Optical Phased Array in Silicon-on-Insulator Cmos", IEEE Journal of Solid-State Circuits, vol. 53, Issue 1, entire document, Jan. 2018.
Ha, et al., "Examination of insulator regime conduction mechanisms in epitaxial and polycrystalline SmNiOsthin films", Journal of Applied Physics, 110, 094102 (2011), entire document.
Helmbrecht, et al., "Piston-tip-tilt positioning of a segmented MEMS deformable mirror," Proceedings of SPIE 6467, MEMS Adaptive Optics, 64670M (Feb. 9, 2007), entire document.
Li, Z., et al., "Correlated Perovskites as a New Platform for Super-Broadband-Tunable Photonics", Advanced Materials, 28, 9117-9125 (2016) and Supporting Information, entire document.
Mike Hanlon, "Eyeglasses with Adaptive Focus", New Atlas, Health and Well Being, Apr. 15, 2006, https://newatlas.com/eyeglasses-with-adaptive-focus/5516 (printed: Jun. 3, 2021), entire document.
Milanovic, V., et al., "Tip-tilt-piston Actuators for High Fill-Factor Micromirror Arrays", Solid-State Sensor, Actuator and Microsystems Workshop, Jun. 6-10, 2004, entire document, www.adriaticresearch.org/Research/pdf/HHH04.pdf.
Shi, et al., "Colossal resistance switching and band gap modulation in a perovskite nickelate by electron doping", Nature Communications 5, 4860 (2014) doi:10.1038/ncomms5860, entire document.
Wang, et al., "Micromirror Based Optical Phased Array for Wide-Angle Beamsteering", MEMS 2017, Las Vegas, Nv, USA, Jan. 22-26, 2017, entire document.
Zewei Shao et al., 'Recent progress in the phase-transition mechanism and modulation of vanadium dioxide materials', NPG Asia Materials, Jul. 25, 2018, entire document [Retrieved on 2021-05-27], Retrieved from the Internet: <URL: https://www.nature.com/articles/s41427-018-Q061-2>.
PCT International Search Report for PCT/US2021/023352 dated Jun. 22, 2021.
PCT Written Opinion of the International Searching Authority for PCT/US2021/023352 dated Jun. 22, 2021.
Shi et al., "A correlated nickelate synaptic transistor", Nature Communications, Oct. 31, 2013, entire document.
U.S. Appl. No. 17/212,611, filed Mar. 25, 2021, Kremer, et al. (non-publication requested).
From U.S. Appl. No. 17/206,927 (now published as US 2021-0363629 A1), Office Action dated Dec. 1, 2021.
PCT International Search Report and Written Opinion from PCT/US2021/023265 dated Jul. 8, 2021.
PCT International Search Report and Written Opinion from PCT/US2021/020544 dated Jun. 23, 2021.
Boileau, A et al. "Mechanisms of Oxidation of NdNiO 3-0 ThermochromicThin Films Synthesized by a Two-Step Method in Soft Condition", The Journal of Physical Chemistry C, 2014, vol. 118, Iss. 11, entire document.
Neumann, B et al. "Niobium-doped TiO2 films as window layer for chalcopyrite solar cells", Physica Status Solidi B, 2008, vol. 245, No. 9, entire document.
Phare, et al., "Silicon Optical Phased Array with High-Efficiency Beam Formation over 180 Degree Field of View" Department of Electrical Engineering, Columbia University, New York, NY 10027, USA, entire document, which may be found at arXiv:1802.04624, 2018.
From U.S. Appl. No. 17/206,927, Office Action dated Feb. 10, 2022.
PCT international Preliminary Report on Patentability (Chapter 11) from PCT/US2021/023352 dated May 19, 2022.

\* cited by examiner

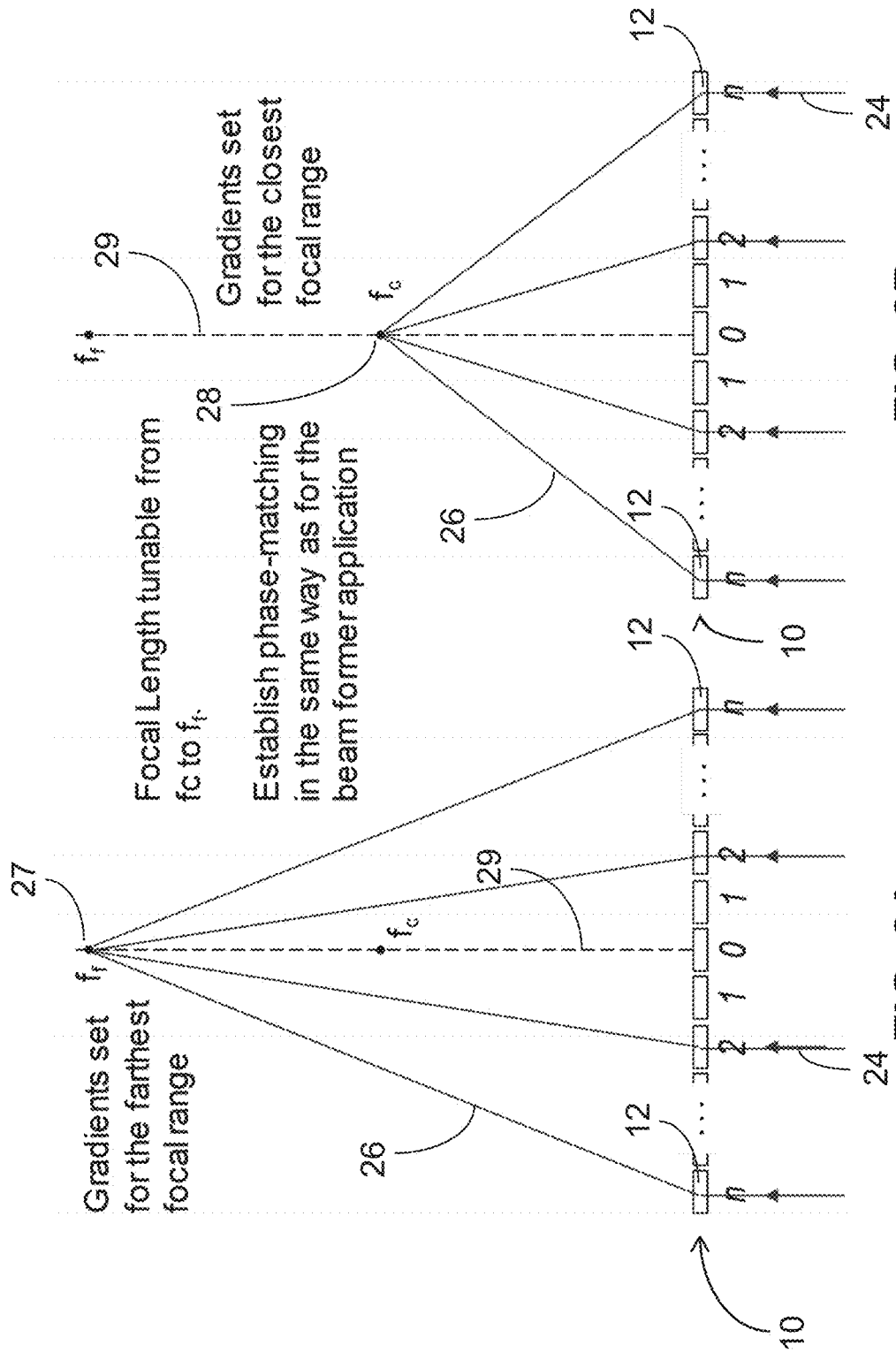

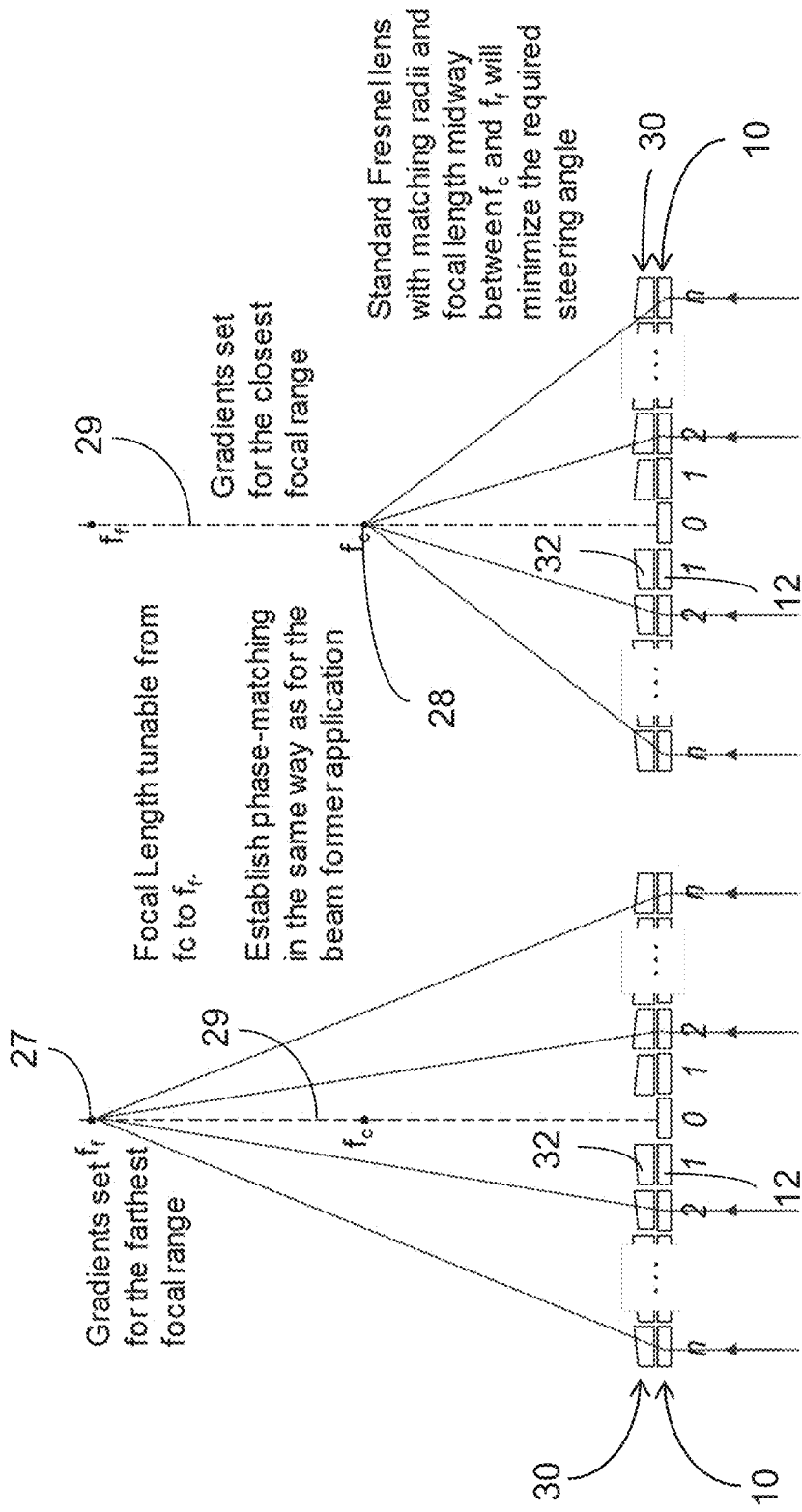

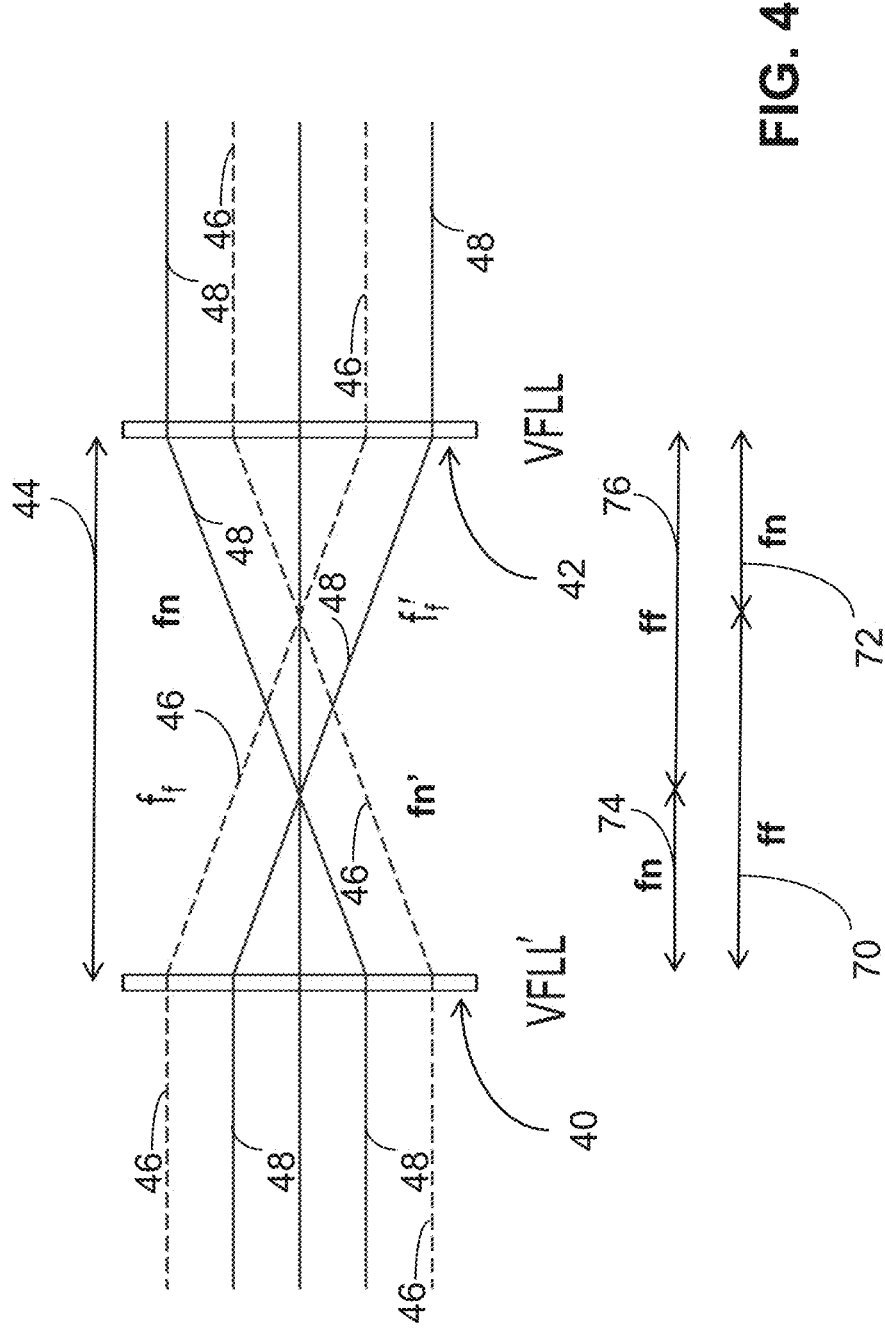

SOLID STATE ELECTRICALLY VARIABLE-FOCAL LENGTH LENS

CROSS REFERENCE TO RELATED APPLICATIONS

This application is related to and claims the benefit of U.S. Provisional Patent Application Ser. No. 63/027,838, filed May 20, 2020, and entitled "Solid State Electrically Variable-Focal Length Lens", which is hereby incorporated herein by reference.

This application is also related to and claims the benefit of U.S. Provisional Patent Application Ser. No. 63/027,844, filed May 20, 2020, and entitled "Solid State Tip-Tilt Phased Array", which is hereby incorporated herein by reference.

This application is also related to and claims the benefit of U.S. Provisional Patent Application Ser. No. 63/027,841, filed May 20, 2020, and entitled "Solid-state Electrically-Variable Optical Wedge", which is hereby incorporated herein by reference.

This application is also related to and claims the benefit of U.S. Provisional Patent Application Ser. No. 63/027,847, filed May 20, 2020, and entitled "Method to Grow IR Optical Materials with Extremely Small Optical Loss", which is hereby incorporated herein by reference.

This application is also related to and claims the benefit of U.S. Provisional Patent Application Ser. No. 63/027,849, filed May 20, 2020, and entitled "Method to Grow Thick Crystalline Optical Films on Si Substrates", which is hereby incorporated herein by reference.

This application is also related to U.S. patent application Ser. No. 16/296,049, filed 7 Mar. 2019, and entitled "Electrically Reconfigurable Optical Apparatus Using Electric Field", which is hereby incorporated herein by reference.

This application is also related to U.S. Provisional Patent Application Ser. No. 63/094,756, filed Oct. 21, 2020, and entitled "Electric Field-Tunable IR Devices with Very Large Modulation of Refractive Index and Methods to Fabricate Them", which is hereby incorporated herein by reference.

STATEMENT REGARDING FEDERAL FUNDING

None

TECHNICAL FIELD

This disclosure relates to variable focal-length lenses.

BACKGROUND

Prior art zoom lenses have been used in photography for over 100 years. A conventional zoom lens achieves the zoom with three or more standard, fixed focal-length lenses, at least one of which moves to provide a variable optical magnification. Disadvantages of these prior art zoom lenses include slow to change zoom settings due to the need to mechanically move the movable lens or lenses, and the need for a finely-machined complex mechanism, which results in a mechanism that is costly and not rugged.

Another prior art zoom lens uses a liquid crystal variable lens. The University of Arizona has been developing such a variable lens. In this prior art a layer of liquid crystal is used to change the optical path length between two lenses such that the focal length changes. This is further described by Mike Hanlon in "Eyeglasses with Adaptive Focus", New Atlas, Health and Well Being, Apr. 15, 2006, which may also be found at https://newatlas.com/eyeglasses-with-adaptive-focus/5516/, which is incorporated herein by reference.

Drawbacks of liquid crystal variable lenses include: changes in zoom are still slow, but faster than a mechanical zoom lens; the temperature range is limited, because at low temperature the liquid may freeze and stop working; the index change is limited, which limits the achievable change in magnification; and it is an immature technology that is still in development.

A related prior art lens is a Fresnel lens, which has a flat optical design. A Fresnel lens is composed of concentric rings that are blazed at angles that change with radius such that the light passing through is deflected toward the focal point. However, a Fresnel lens has a fixed focal length, so it is not an adjustable focus or zoom lens.

Also in the prior art are beam steering systems that have utilized mechanically actuated mirrors. Milanovic, V., et al., describes such a mechanically actuated mirror in "Tip-tilt-piston Actuators for High Fill-Factor Micromirror Arrays", www.adriaticresearch.org/Research/pdf/HHH04.pdf, which is incorporated herein by reference.

What is needed is an improved variable focal length lens that has no moving parts, and that can be rapidly configured for different focal lengths, and also steered with no moving parts. The embodiments of the present disclosure answer these and other needs.

SUMMARY

In a first embodiment disclosed herein, a solid state electrically variable focal length lens comprises a plurality of concentric rings of electro-optical material, wherein the electro-optical material comprises any material of a class of hydrogen-doped phase-change metal oxide and wherein each respective concentric ring further comprises a transparent resistive sheet on a first face of the respective concentric ring, wherein the transparent resistive sheet extends along the first face, and a first voltage coupled between a first end and a second end of the transparent resistive sheet, wherein the first voltage may be varied to select an optical beam deflection angle.

In another embodiment disclosed herein, a solid state zoom lens comprises a first plurality of first concentric rings of first electro-optical material, wherein the first electro-optical material comprises any material of a class of hydrogen-doped phase-change metal oxide and wherein each respective first concentric ring further comprises a first transparent resistive sheet on a first face of the respective first concentric ring, wherein the first transparent resistive sheet extends along the first face; and a first voltage coupled between a first end and a second end of the first transparent resistive sheet, and wherein the first voltage may be varied to select a beam deflection angle, and a second plurality of second concentric rings of second electro-optical material, wherein the second electro-optical material comprises any material of a class of hydrogen-doped phase-change metal oxide and wherein each respective second concentric ring further comprises a second transparent resistive sheet on a first face of the respective second concentric ring, wherein the second transparent resistive sheet extends along the first face, and a second voltage coupled between a first end and a second end of the second transparent resistive sheet, wherein the second voltage may be varied to select a beam deflection angle, and wherein the first plurality of concentric rings are optically coupled to the second plurality of concentric rings.

In yet another embodiment disclosed herein, a method of providing a solid state electrically variable focal length lens comprises providing a plurality of concentric rings of electro-optical material, wherein the electro-optical material comprises any material of a class of hydrogen-doped phase-change metal oxide and wherein providing each respective concentric ring further comprises providing a transparent resistive sheet on a first face of the respective concentric ring, wherein the transparent resistive sheet extends along the first face, and providing a first voltage coupled between a first end and a second end of the transparent resistive sheet, wherein the first voltage may be varied to select a optical beam deflection angle.

In still another embodiment disclosed herein, a method of providing a solid state zoom lens comprises providing a first plurality of first concentric rings of first electro-optical material, wherein the first electro-optical material comprises any material of a class of hydrogen-doped phase-change metal oxide and wherein providing each respective first concentric ring further comprises providing a first transparent resistive sheet on a first face of the respective first concentric ring, wherein the first transparent resistive sheet extends along the first face, and providing a first voltage coupled between a first end and a second end of the first transparent resistive sheet, wherein the first voltage may be varied to select a beam deflection angle, and providing a second plurality of second concentric rings of second electro-optical material, wherein the second electro-optical material comprises any material of a class of hydrogen-doped phase-change metal oxide and wherein providing each respective second concentric ring further comprises providing a second transparent resistive sheet on a first face of the respective second concentric ring, wherein the second transparent resistive sheet extends along the first face, and providing a second voltage coupled between a first end and a second end of the second transparent resistive sheet, wherein the second voltage may be varied to select a beam deflection angle, and wherein the first plurality of concentric rings are optically coupled to the second plurality of concentric rings.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 2A shows an example section through the diameter of the concentric ring array where the radial gradients for each ring are set for a far focal range $f_f$ in accordance with the present disclosure, and FIG. 2B shows an example section through the diameter of the concentric ring array where the radial gradients for each ring are set for a close focal range $f_c$ in accordance with the present disclosure.

FIG. 3A shows an example section through the diameter of the concentric ring array in which the variable length lens is paired with a Fresnel lens, and where the radial gradients for each ring are set for a far focal range $f_f$ in accordance with the present disclosure, and FIG. 3B shows an example section through the diameter of the concentric ring array in which the variable length lens is paired with a Fresnel lens and where the radial gradients for each ring are set for a close focal range $f_c$ in accordance with the present disclosure.

FIG. 4 shows a first variable focal length lens in accordance with the present disclosure paired with a second variable focal length lens in accordance with the present disclosure to form a solid state zoom or variable focus lens in accordance with the present disclosure.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Figures 1A, 1B:
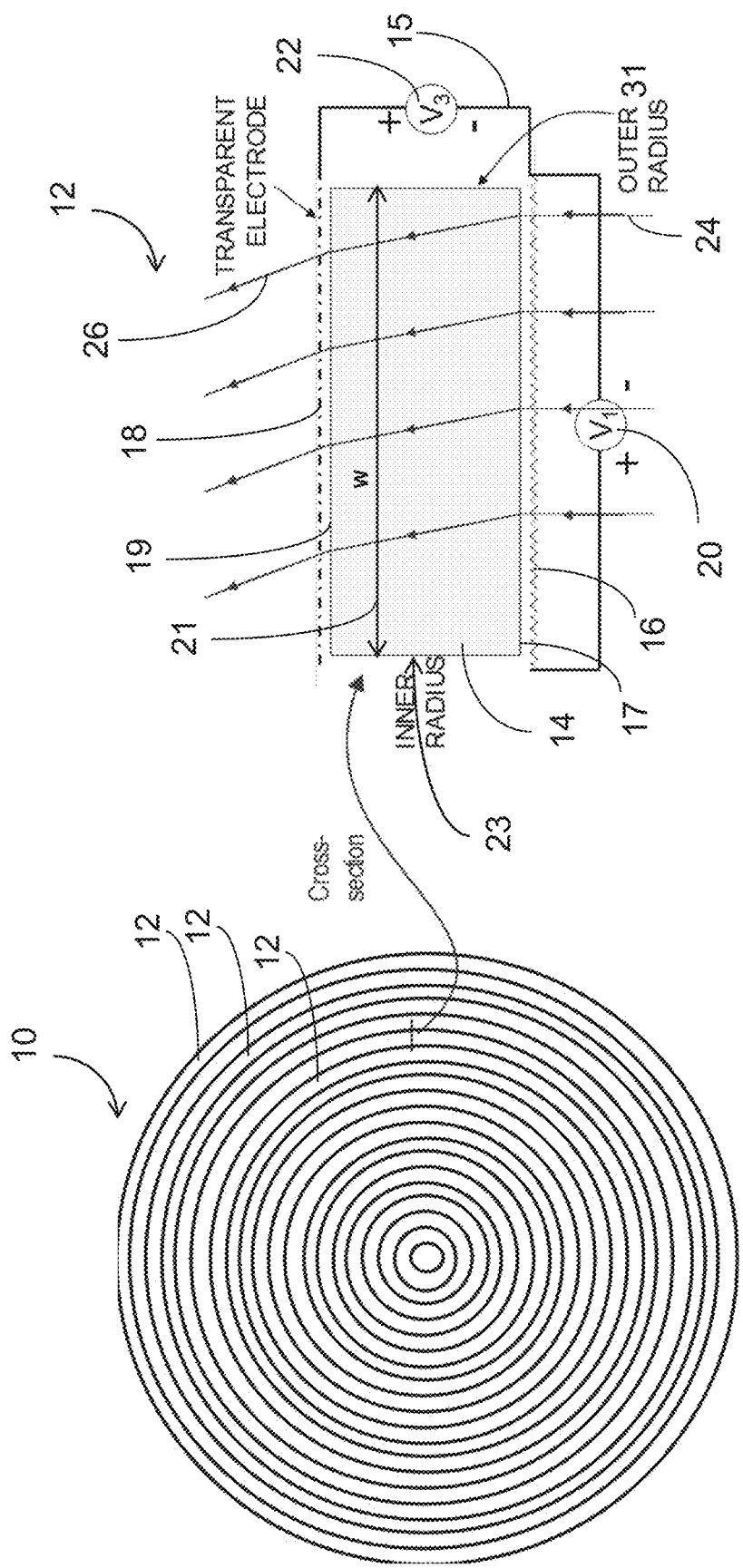
FIG. 1A shows concentric rings of the electro optic material and FIG. 1B shows a detailed view of a section of one of the rings showing electrical controls for achieving a desired deflection angle and for applying a beam forming phase shift in accordance with the present disclosure.

The present disclosure describes a solid state electrically variable focal length lens that has concentric rings 12, as shown in FIG. 1A, of an electro-optical (E/O) material 14, which may be of a class of hydrogen-doped phase-change metal oxide (H-PCMO) materials typified by neodymium nickelate ($NdNiO_3$). This material is the subject of U.S. Provisional Patent Application Ser. No. 63/027,847, filed May 20, 2020, entitled "Method to Grow IR Optical Materials with Extremely Small Optical Loss", and U.S. Provisional Patent Application Ser. No. 63/027,849, filed May 20, 2020, entitled "Method to Grow Thick Crystalline Optical Films on Si Substrates", which are incorporated herein by reference. The electro-optical material 14 may, in addition to $NdNiO_3$, be $SmNiO_3$, $PrNiO_3$, $EuNiO_3$, and $GdNiO_3$. These materials may be used individually or combined to form the E/O material 14 utilized in the embodiments described herein. The E/O H-PCMO material 14 is essentially transparent over the infrared wavelength range, and may have an extremely small optical loss, for example, an optical extinction coefficient k less than 0.001.

Figure 5:
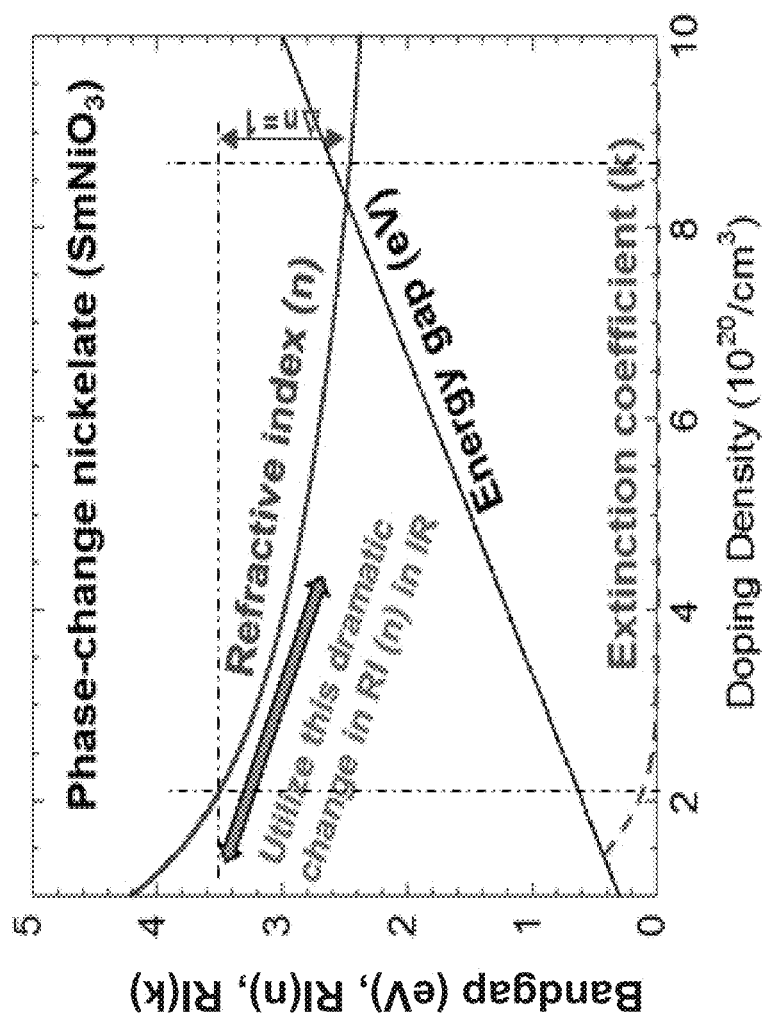
FIG. 5 shows an example change in bandgap (eV) and refractive index of material as a function of hydrogen doping density in accordance with the present disclosure.

The E/O material 14 changes its index of refraction when an electric field is applied to the E/O material 14. FIG. 5 shows the change in bandgap (eV) and refractive index as a function of hydrogen doping density for $SmNiO_3$. The refractive index (RI) is a complex number usually written RI=n+i*k. The left axis of FIG. 5 shows the bandgap in eV, RI (n) the real part of the refractive index, and RI(k) the imaginary part of the refractive index. The real part n indicates the phase velocity, while the imaginary part K is called the extinction coefficient. For the material $SmNiO_3$, FIG. 5 shows that it is desirable to have a hydrogen doping density of up to about $10^{21}$ hydrogen ions/$cm^3$ to achieve a desired refractive index change.

The concentric rings 12, as shown in FIG. 1A, may be configured in such a way that a radial voltage gradient applied across a ring 12 results in a radial gradient in the index of refraction to steer light passing through the ring 12 toward an optical axis of the device. The totality of the concentric rings 12 can be made to result in a spherical wave converging toward a desired focal point. A variable focal-length lens is achieved by changing a radial voltage gradient applied across each ring 12. The radial voltage gradient for a respective ring 12 may be different than a radial voltage gradient applied across another respective ring 12.

The solid state electrically variable focal length lens of the present disclosure may be thought of and described as a variable focal length Fresnel lens that forms a coherent spherical wave, which is the sum of the contributions from each of the rings 12. The solid state electrically variable focal lens of the present disclosure has flat rings 12, which are arranged concentrically. The deflection angle of each ring 12 can be varied to change the focal length of the overall lens. Further the phase emitted from each ring of the present disclosure may be adjusted to produce coherence in the focused spherical wave. In contrast, a Fresnel lens has a fixed focal length, and a conventional Fresnel lens can be regarded as an array of prisms arranged in a circular fashion, with steeper prisms on the edges, and a flat or slightly convex center.

The solid state electrically variable focal length lens of the present disclosure can replace slow moving, mechanical lenses and has a much greater range of variable focus than a liquid crystal variable lens. The advantages of the solid state electrically variable focal length lens include that the lens is solid state and therefore has no moving parts, that the lens can be grown so no grinding and polishing of a lens is required, and that the lens can be rapidly reconfigured for different focal lengths.

FIG. 1A shows a solid state electrically variable focal length lens 10, which has concentric rings 12 of the electro-optical material 14 described above. FIG. 1B shows a detailed view of a section of one of the rings 12 showing the electro-optical material 14, a transparent resistive sheet 16 on a first face 17 of the ring 12, and a transparent electrode 18 on a second face 19 of the ring 12. The first face 17 and the second face 19 of the ring 12 are on opposite sides of the ring 12. The transparent resistive sheet 16 extends along a width 21 of the first face 17 of the ring 12. A voltage $V_1$ 20 is applied across the transparent resistive sheet 16 from an outer radius 31 of the ring 12 to an inner radius 23 of the ring 12. The transparent electrode 18 extends along a width 21 of the second face 19 of the ring 12. A second voltage $V_3$ 22 may be applied to the transparent electrode 18. The voltage $V_1$ 20 and the voltage $V_3$ 22 may be DC voltages. The negative terminal of voltage $V_1$ 20 and the negative terminal of $V_3$ 22 are connected by conductor 15, as shown in FIG. 1B. The resistive sheet 16 may be made of any suitable material, such as vanadium oxide, tin oxide, a nanowire grid, graphite sheets, or other materials known in the art. The transparent electrode 18 is a sheet with as low of a resistance as is consistent with it being mostly transmissive to photons. The transparent electrode 18 operates like a constant voltage plane as a reference to the resistive sheet (16) whose value of Ohms/square is selected to provide an acceptable operating point with low power operation and high speed operation.

The voltage $V_1$ 20 may be varied to steer an optical beam to a desired deflection angle. The second variable voltage $V_3$ 22 may be varied to apply a beam forming phase-shift.

The voltage $V_1$ 20 applied across the transparent resistive sheet 16 applies a radial electric field gradient along a respective ring 12. The radial electric field gradient along the respective ring 12 deflects the incident optical beam 24 on the respective ring 12 toward an optical axis as shown by outgoing light wave 26 in FIG. 1B. The magnitude of the voltage $V_1$ 20 determines where the focus is along the optical axis.

The voltage $V_3$ 22, for each ring 12, is selected such that the peaks and valleys of the outgoing light wave 26 align spatially and temporally to outgoing light waves 26 from other rings 12 to form a single focused and phase coherent beam. Aligning the multiple beam elements in this way produces phase coherence among the contributions. A conventional Fresnel lens has a further disadvantage of not being able to form a coherent light beam. Algorithms for determining the appropriate phase-shifts to produce coherence have appeared in the literature, for example, as described by Christopher T. Phare, Min Chul Shin, Steven A. Miller, Brian Stern, and Michal Lipson, in "Silicon Optical Phased Array with High-Efficiency Beam Formation over 180 Degree Field of View" Department of Electrical Engineering, Columbia University, New York, N.Y. 10027, USA, which may be found at arXiv:1802.04624 [physics.app-ph), and which is incorporated herein by reference.

FIG. 2A shows an example section through the diameter of the concentric ring array where the radial electric field gradient for each respective ring 12 of the solid state electrically variable focal length lens 10 is set for a focal length or focus at far focal range $f_f$ 27 by adjusting the voltage $V_1$ 20 for each respective ring 12. FIG. 2B shows an example section through the diameter of the concentric ring array where the radial electric field gradient for each respective ring 12 of the solid state electrically variable focal length lens 10 is set for a focal length or focus at close focal range $f_c$ 28 by adjusting the voltage $V_1$ 20 for each respective ring 12. The numbers 0, 1, 2 . . . n in FIGS. 2A and 2B refer to different rings 12 with the ring with number 0 being in the center of the lens, 1 being the next ring 12 from the center, 2 being the next ring 12 from the center, and so on to the nth ring 12.

The ring with number 0 is a disk in FIGS. 2A and 2B, and does not need a ramped voltage distribution—only a constant voltage applied across the two faces. This allows adjustment of the phase of the light passing through ring 0 to end up in-phase with light from the other rings light and to apply an overall phase shift to the focused light.

In an alternate embodiment, ring 0 could be a void—without an ability to adjust its phase. This would require the void to be the reference phase for the phase settings on all other rings. The overall phase of the resulting focus is the same as the phase of the center of the beam, so there is no capability to apply an overall phase shift relative to, for example, another beam in an interferometer.

In short ring 0 could be either a disk or a void—but the disk version, as shown in FIGS. 2A and 2B has more flexibility and more employment options.

The control voltages $V_1$ 20 and $V_3$ 22 for each respective ring shaped element 12 are determined by the desired focal length and are specific to that respective ring element 12. As shown in FIGS. 2A and 2B, the more central ring elements 12 (e.g. 0, 1, 2, . . . ) require only a small deflection angle while the outer ring elements 12 (e.g. . . . , n-2, n-1, n) require the largest deflection angle to focus to a focal length along the optical axis 29. To vary the focal length of the lens, the voltages $V_1$ 20 and $V_3$ 22 are varied for all ring elements 12.

As described above, the magnitude of the voltage $V_1$ 20 for each ring element determines where the focus is along the optical axis 29. The voltage $V_3$ 22, for each ring 12, is selected such that the peaks and valleys of the outgoing light waves 26 align spatially and temporally to form a single focused and phase coherent beam.

FIGS. 3A and 3B show an embodiment, showing an example section through the diameter of the concentric ring array in which the solid state variable length lens 10 is paired with a standard Fresnel lens 30. In FIG. 3A the radial gradients for each ring 12 of the solid state electrically variable focal length lens 10 are set for a focal length or focus at far focal range $f_f$ 27. In FIG. 3B the radial gradients for each ring 12 of the solid state electrically variable focal length lens 10 are set for a focal length or focus at the close focal range $f_c$ 28.

Each ring 32 of the Fresnel lens 30 has a radius and width that matches the radius and width of the adjacent ring 12. Further, the rings 32 in the Fresnel lens 30 are aligned to the rings 12 of the solid state variable length lens 10. If the Fresnel lens 30 has a focal length midway between the farthest focal range $f_f$ 27 for the solid state variable length lens 10 and the closest focal range $f_c$ 28 for the solid state variable length lens 10, then the required steering angle for the solid state electrically variable focal length lens 10 can be minimized.

For any specific ring shaped element design, the material properties of the electro-optical material 14 place a practical limit on the maximum deflection angle attainable. By pairing each ring element 12 to a Fresnel lens ring 32 that provides a constant or fixed offset angle equal to the mean of the angles of the desired far and close focal points, the dynamic deflection capability and variable focusing of the solid state variable length lens 10 can be used to provide the difference between the mean angle provided by the Fresnel lens and the desired deflection angles. Using a Fresnel lens in this way enables construction of larger diameter variable lenses and allows a broader range of materials to be used. Further, using a Fresnel lens enables lenses with a smaller f-number. The combination of the variable focal length lens 10 with the standard Fresnel 30 results in a lens that can achieve, for a given set of voltages $V_1$ 20, a smaller closest focal range $f_c$ 28 than can be achieved without the standard Fresnel lens 30.

Figure 3C:
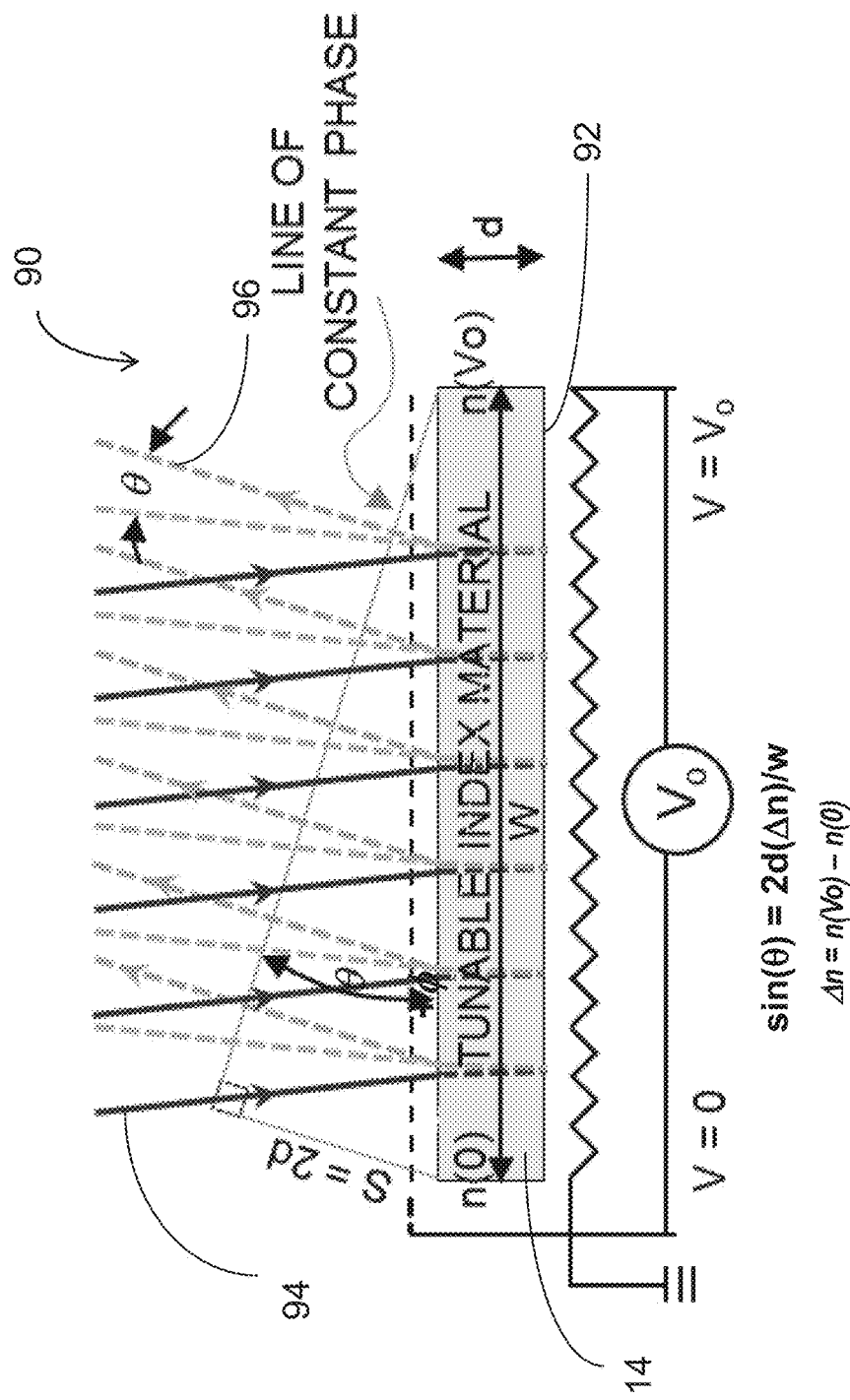
FIG. 3C is a side elevation view of a reflective embodiment for steering an optical plane wave using a solid state electrically-variable optical wedge in accordance with the present disclosure.

The embodiments of the preceding figures show each ring 12 with a solid state electrically-variable optical wedge (SSEVOW) steering an optical beam being transmitted through the ring 12. Instead the solid state electrically-variable optical wedge (SSEVOW) may be configured and used in a reflective embodiment, as shown in FIG. 3C, which shows a solid state electrically-variable optical wedge (SSEVOW) 90 with the E/O material 14. SSEVOW 90 is a cross-section of a ring 12 shown in FIG. 1A. The solid state electrically-variable optical wedge (SSEVOW) 90 has a mirror 92 at the output to reflect the incident light wave 94 back into the E/O material 14. The reflected light 96 exits the through the E/O material 14 with a phase shift. Because the light wave travels two times through the E/O material 14, the same steering effect as the transmissive configuration of, for example FIG. 1A, may be obtained with one-half the thickness of E/O material 14. The voltage necessary to achieve a particular electric field level inside the E/O material 14 may be reduced at the expense of a limited field of regard due to self-shadowing and a higher element capacitance which results in a slower temporal response. Note that the voltage $V_0$ in FIG. 3C corresponds to voltage $V_1$ shown in FIG. 1B.

FIG. 4 shows an embodiment in which a first solid state variable focal length lens 40 (VFLL') is paired with a second solid state variable focal length lens 42 (VFLL) to form a solid state zoom or variable focus lens. In this embodiment, the sum of the focal lengths of the two lenses 40 and 42 must equal the fixed spacing 44 between the lenses (coincident focal points). The dashed lines 46 represent the case in which the left lens 40 is focused to its "far" $f_f$ focal length 70 (located a distance $f_f$ to the right of lens 40) and the right lens 42 is focused to its "near" or "close" $f_n$ focal length 72 (located a distance $f_n$ to right of lens 42). The lenses are spaced by distance 44 $d=f_f+f_n$. The solid lines 48 represent the opposite case in which the left lens 40 is focused to its "near" $f_n$' focal length 74 (located a distance $f_n$ to the right of lens 40) and the right lens 42 is focused to its "far" $f_f$ focal length 76.

It is standard in optics drawings to have the light incident from the left. The largest magnification in FIG. 4 is max magnification=$f_n/f_f$, which for example is represented by lines 48 in FIG. 4. The max demagnification is $f_n/f_f$, which for example is represented by lines 48 in FIG. 4. So the magnification ratio is the ratio of these two values, or $f_f*f_f/f_n*f_n$. Any magnification between the extremes may be achieved by adjusting the coincident focal point at a selected common point between $f_f$ and $f_n$.

Figure 6:
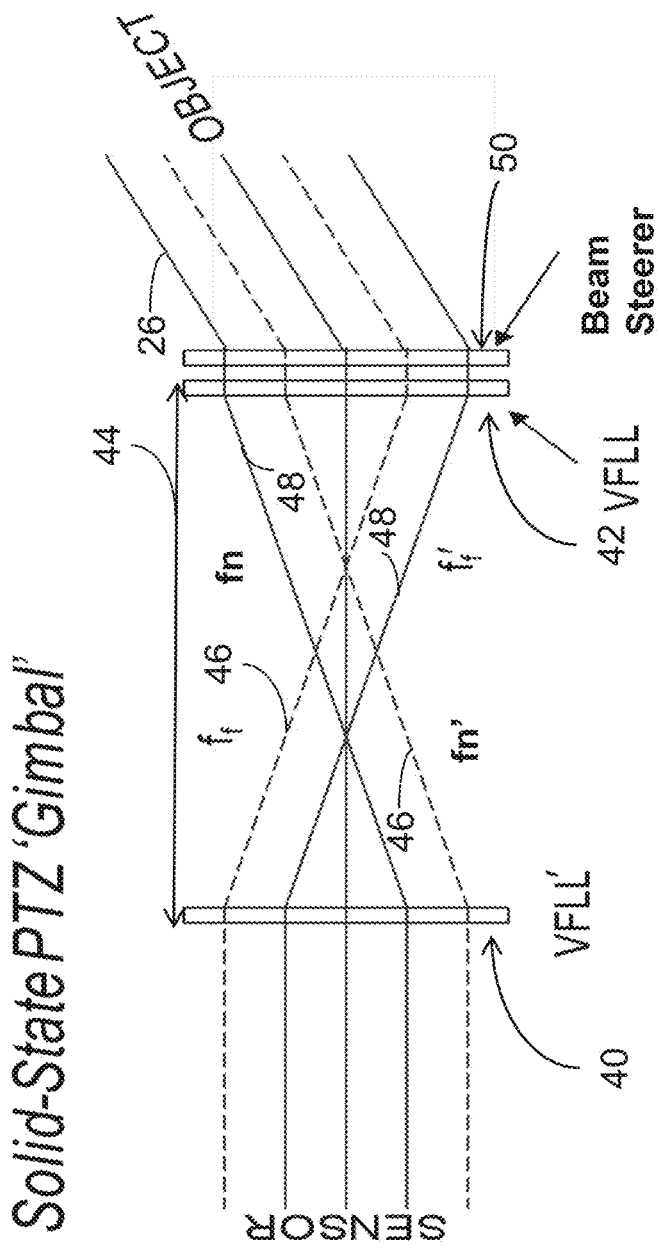
FIG. 6 shows a first variable focal length lens in accordance with the present disclosure paired with a second variable focal length lens in accordance with the present disclosure with an adjacent solid state Tip-Tilt-Phased array to form a solid state pan-tilt-zoom gimbal with no moving parts in accordance with the present disclosure.

FIG. 6 shows yet another embodiment showing the solid state zoom or variable focus lenses 40 and 42 of FIG. 4 combined with a solid state optical tip-tilt-phased (TTP) array 50, which is the subject of U.S. Provisional Patent Application Ser. No. 63/027,844, filed May 20, 2020, which is incorporated herein by reference. This embodiment provides a solid state pan-tilt-zoom (PTZ) "gimbal" with no moving parts. The solid state TTP array 50 provides steering to the pan and tilt angles while the solid state zoom or variable focus lenses 40 and 42 provide the zoom feature. The use of a solid state TTP 50 has several benefits. A very high reconfiguration speed (~microseconds), and a large angular throw (45 degrees being typical) can be achieved.

Figure 7:
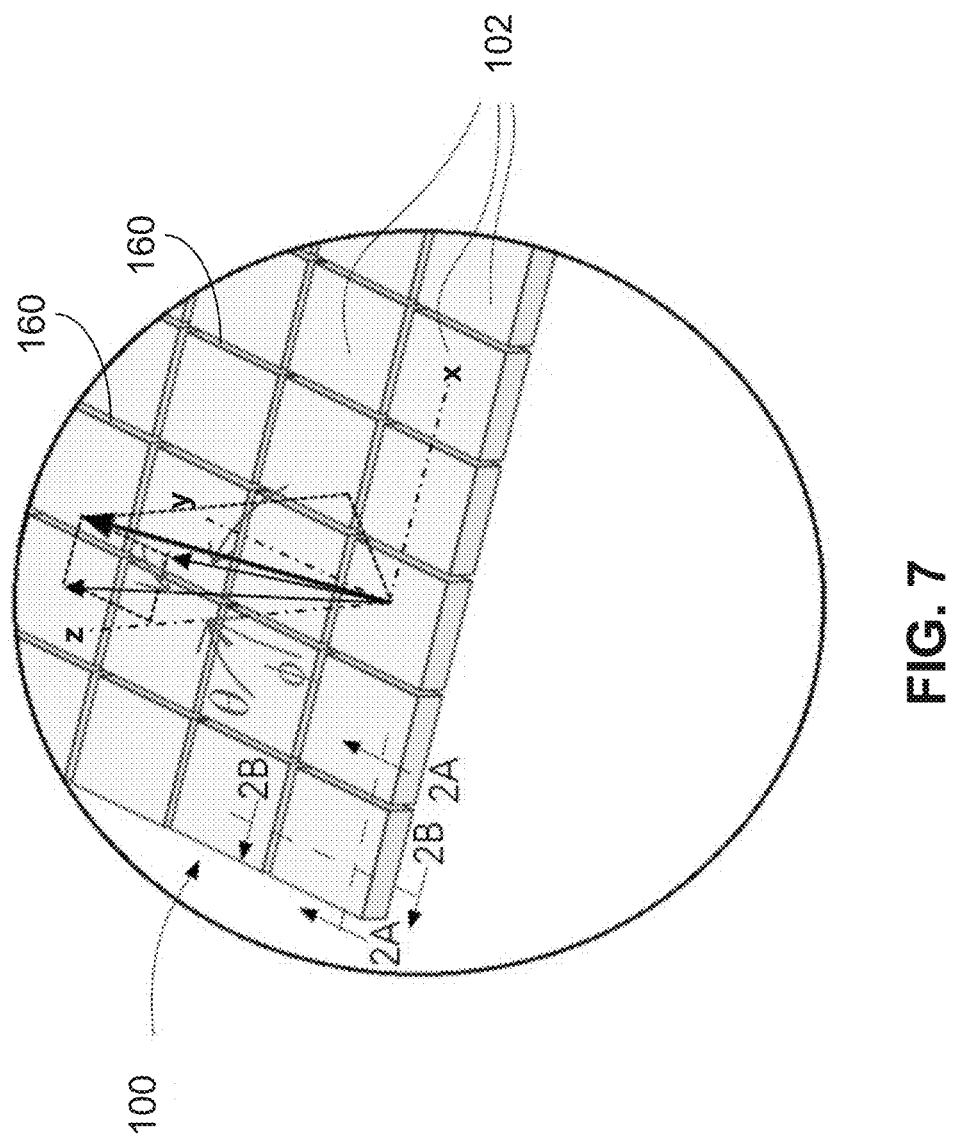
FIG. 7 depicts a two dimensional array of elements, in which each element may direct its beamlet in a same direction (Om) and provides up to $2\pi$ phase lag to cohere all beamlets into a single beam in accordance with the present disclosure.
Figure 8:
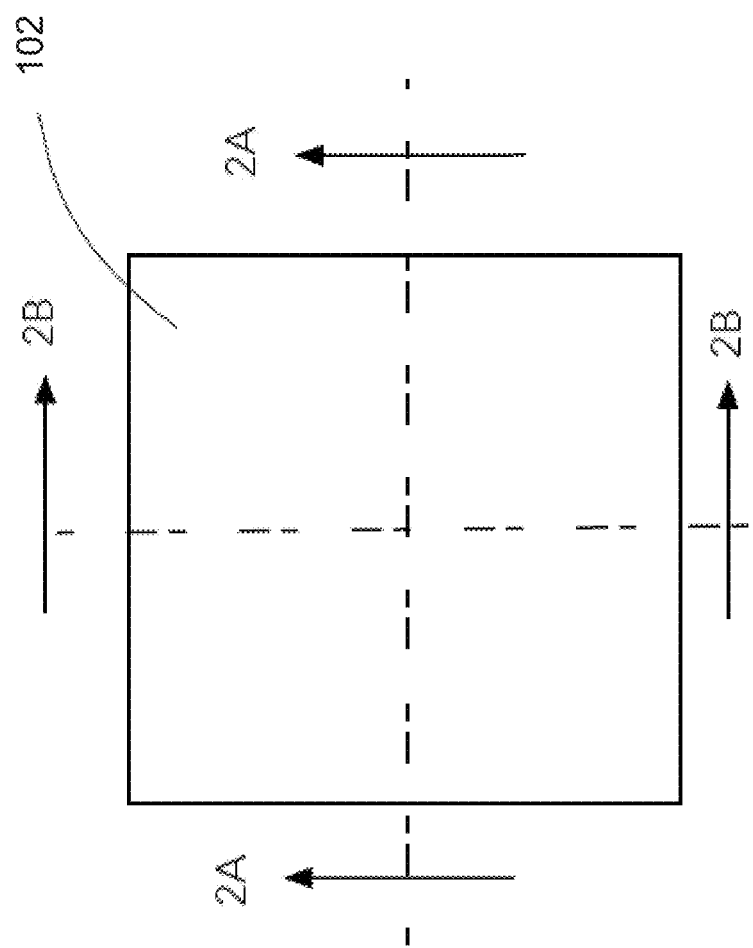
FIG. 8 shows a plan view of a single element of the two dimensional array of elements shown in FIG. 7 and showing the orientations 2A and 2B of the element in accordance with the present disclosure.

FIG. 7 depicts a two dimensional array 100 of elements 102, which together form a solid-state tip-tilt-phased array 50. FIG. 8 is a plan view of a single element 102. The two dimensional array 100 may have N×N elements 102; however, a solid-state tip-tilt-phased array 50 may also be formed with a single element 102. Each element includes the electro-optical (E/O) material 14 which as described above may be of a class of hydrogen-doped phase-change metal oxide (H-PCMO) materials typified by neodymium nickelate ($NdNiO_3$). As further described above, H-PCMO materials in addition to $NdNiO_3$ may be used, including $SmNiO_3$, $PrNiO_3$, $EuNiO_3$, and $GdNiO_3$. These materials may be used individually or combined to form the E/O material 14 utilized in the embodiments described herein. The E/O H-PCMO material 14 is essentially transparent over the infrared wavelength range, and may have an extremely small optical loss, for example, an optical extinction coefficient k less than 0.001.

Figure 9:
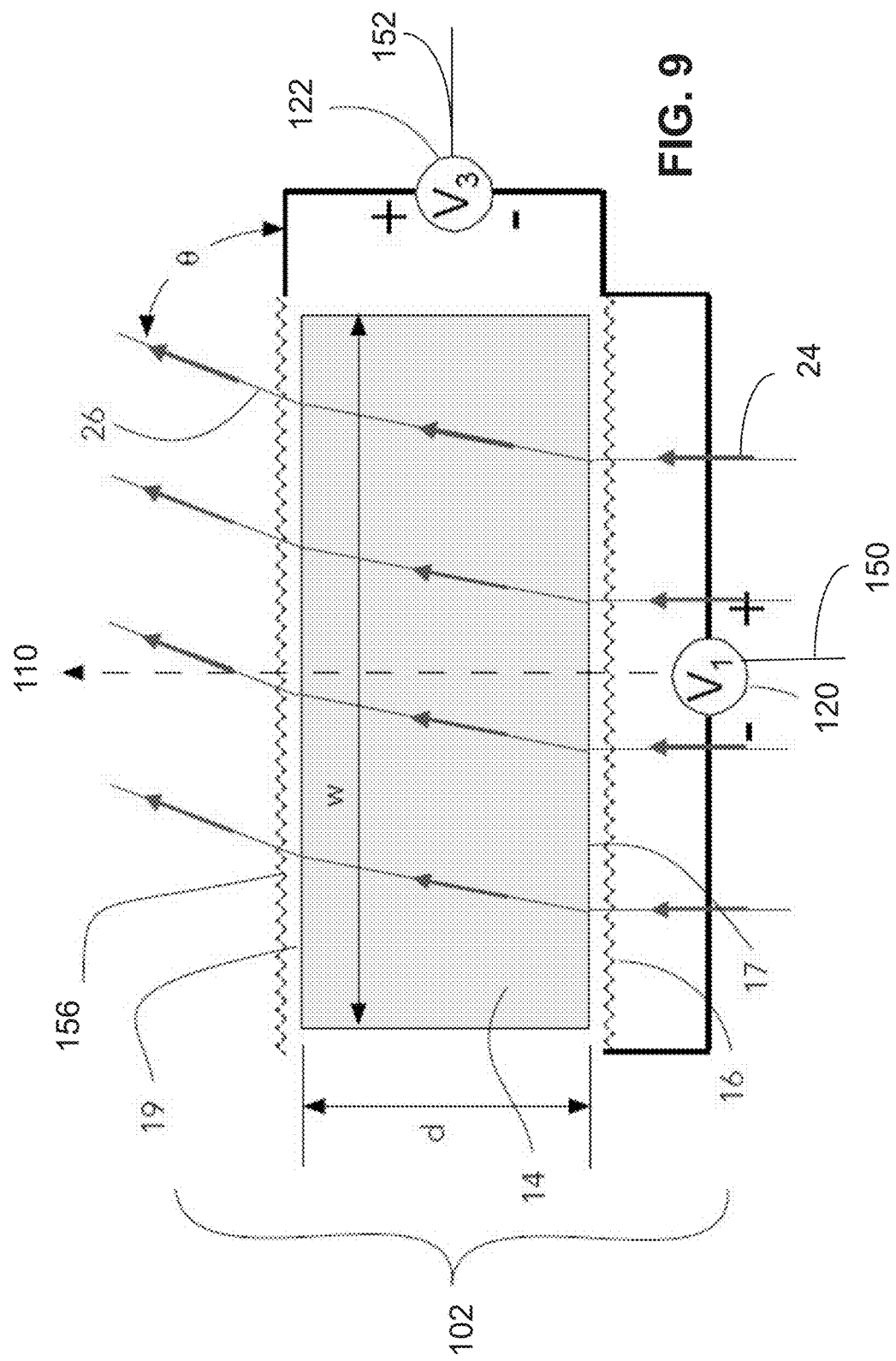
FIGS. 9, 10 and 11 show the elements of the array in greater detail and show the voltages applied to each element in accordance with the present disclosure.
Figure 10:
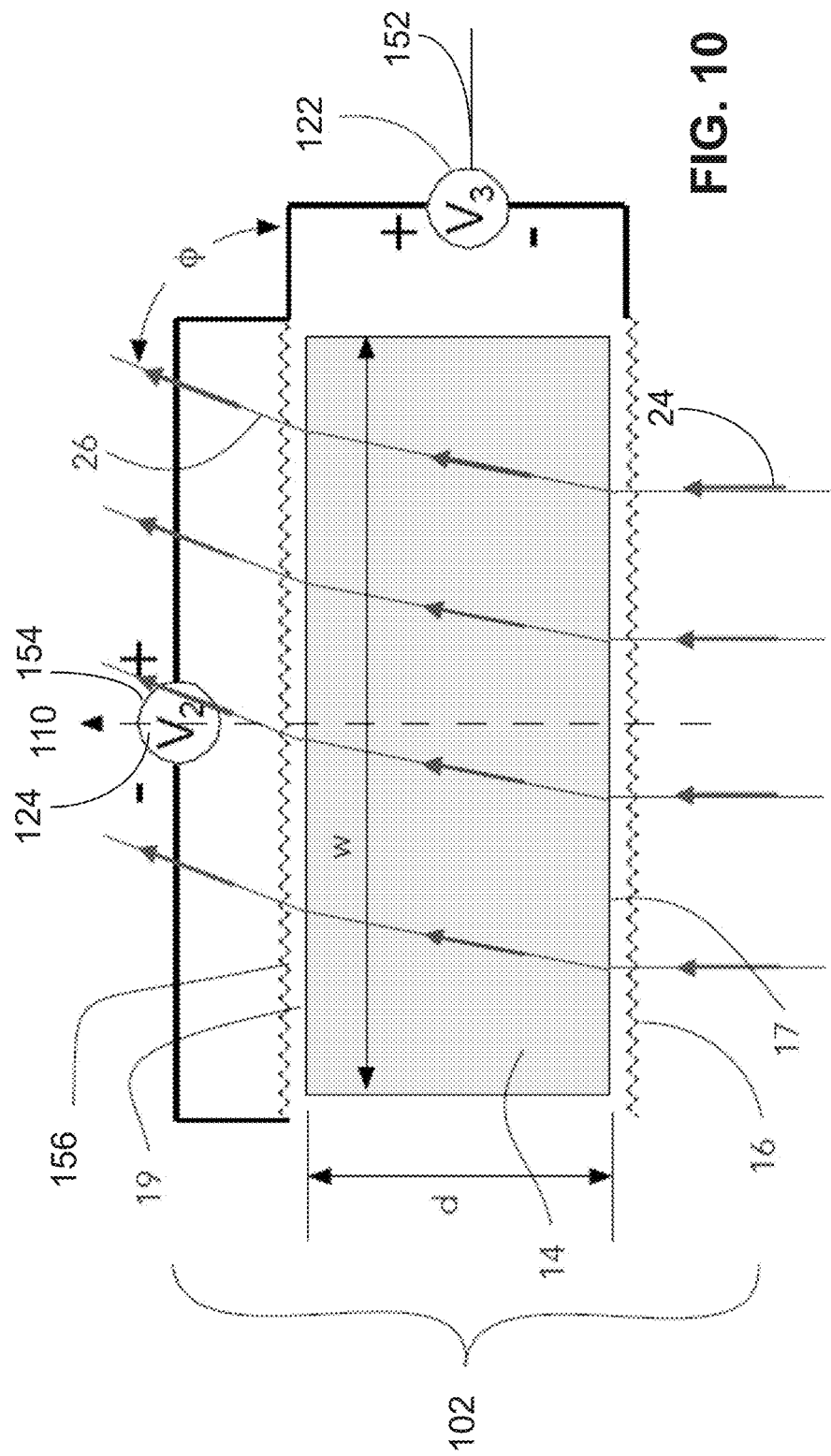
Figure 11:
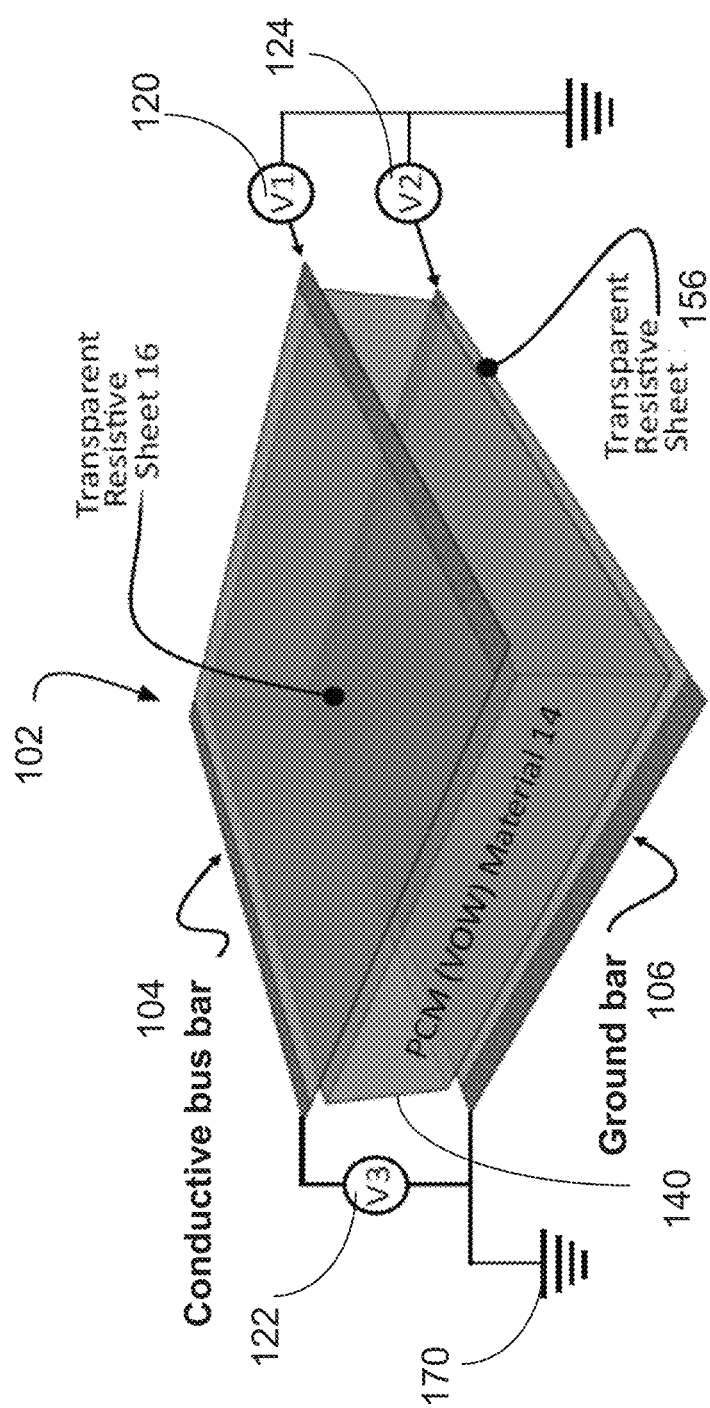

FIG. 11 is a three dimensional view showing how control voltages $V_1$ 120, $V_2$ 124, and $V_3$ 122 are applied. Control voltages $V_1$ 120 and $V_2$ 124 are applied across transparent resistive sheets 16 and 156, which are arranged across opposite sides of the E/O material 14. The voltage fields created by $V_1$ 120 and $V_2$ 124 are set at a right angle to each other, as best shown in FIG. 11. FIGS. 9 and 10 are side elevational views taken at a right angle to each other. With reference to FIG. 7, FIG. 9 is a cross sectional view of element 102 along the cut 2A-2A and FIG. 10 is a cross sectional view of element 102 along the cut 2B-2B. In FIGS. 9 and 11 control voltage $V_1$ 120 is applied across transparent resistive sheet 16, while in FIGS. 10 and 11 control voltage $V_2$ 124 is applied across transparent resistive sheet 156 in a direction at a right angle to the control voltage $V_1$ 120 applied across transparent resistive sheet 16. Control voltage $V_3$ 122 is further discussed below. FIGS. 9 and 10 show the control lines 150, 152 and 154 that control voltages $V_1$ 120, $V_3$ 122, and $V_2$ 124, respectively.

FIG. 11 is a three dimensional view showing the voltages applied to the resistive sheets 16 and 156. The resistive sheets 16 and 156 may be made of any suitable material, such as vanadium oxide, tin oxide, a nanowire grid, graphite sheets, or other materials known in the art. The value of the sheet resistance in Ohms/square of sheets 16 and 156 may be selected for good device design noting that the overall resistance sets the current necessary to maintain a set voltage and, hence, establishes overall power consumption by the element 102.

One side of each sheet 16 and 156 may have a conductive bus bar disposed at one edge thereof while the voltage to be applied is applied to a conductive bus bar disposed at the opposing edge thereof. The conductive bus bar 106 may be a conductive bus bar 106 directly coupled to ground 170, while the conductive bus bar 104 of sheet 16 may be coupled to ground via control voltage $V_3$ 122. If control voltage $V_3$ 122 is zero volts, then the conductive bus bar 104 is directly coupled to ground. The corner where the control voltage $V_3$ 122 is applied may be thought of as a common ground corner 140, especially when control voltage $V_3$ 122 has a voltage of zero volts or control voltage $V_3$ 122 is not utilized, in which case the control voltage $V_3$ 122 shown in the figures would be replaced with a wire connection.

Figure 12:
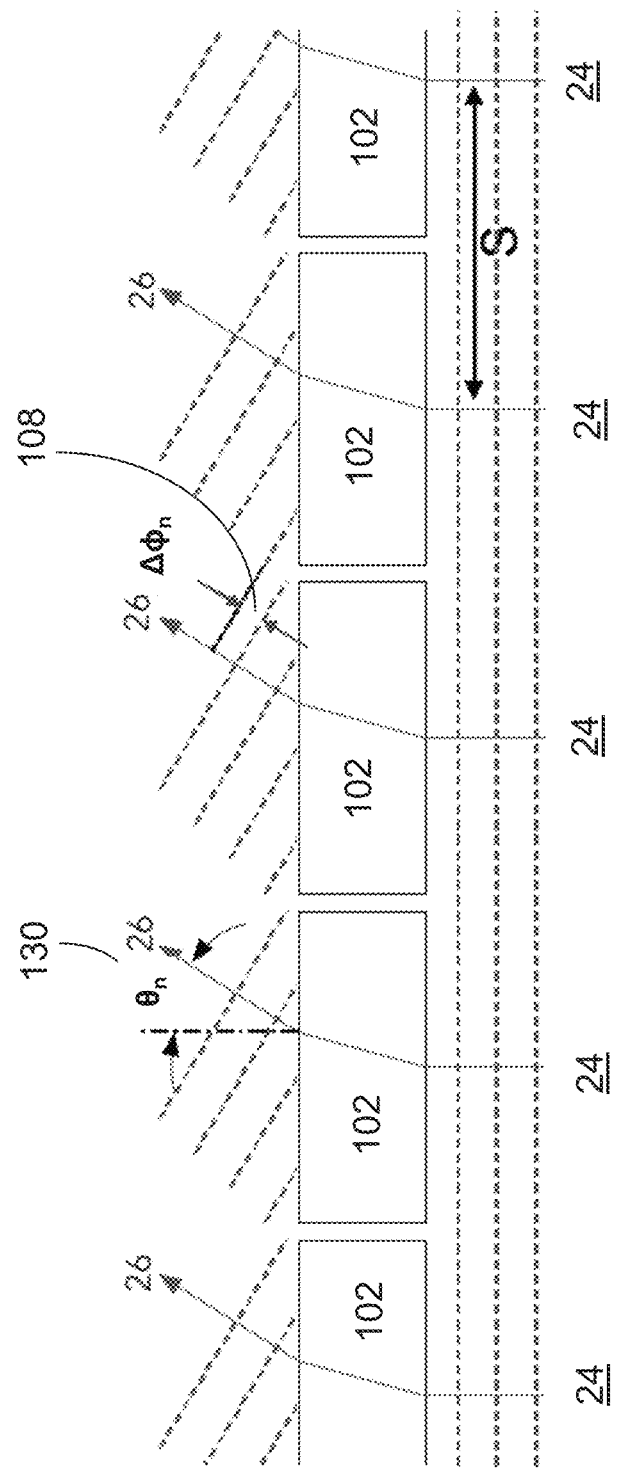
FIG. 12 is a side elevational view a portion of the array of elements with a plane-wave incident from below becoming many beamlets that are made to cohere into one beam in accordance with the present disclosure.

Consider the top resistive sheet 16. Applying $V_1$ 120 to its bus bar results in a linear voltage gradient between $V_1$ 120 and the conductive bus bar 104. Likewise, $V_2$ 124 results in a similar smooth gradient in the cross-direction in bottom resistive sheet 156 between $V_2$ 124 and the ground bus bar 106. Together these two voltages steer the beam of incident light 24 to outgoing light 26, as shown in FIGS. 9, 10 and 12. The voltage $V_3$ 122 is needed at the pinned corner between resistive sheets 16 and 156 only if there is a desire to apply an over-all phase adjustment to the light passing through the E/O material 14. If there is only a single-element 102 for solid-state tip-tilt-phased array 50, then the voltage $V_3$ 122 is replaced with a short circuit that grounds sheets 16 and 156 at the common ground corner 140 of the element 102. All voltages are referenced to wafer-ground, so only a single control line is required for each. The gradient across the bottom resistive sheet 156 is $V_2/w$, where w is the width of the element 102. The gradient across the top resistive sheet 16 is then $(V_1-V_3)/w$, again where w is the width of the element 102.

Each element 102 directs an outgoing beamlet 26 in the same direction ($\theta$, $\varphi$) and provides up to $2\pi$ phase lag to cohere all beamlets 26 into a single beam. Relative to the x, y, and z axes in FIG. 7, with the array 100 in the x-y plane, then $\theta$ is the angle between the z-axis and the projection of beamlet 26 onto the x-z plane, and $\varphi$ is the angle between the z-axis and the projection of beamlet 26 onto the x-y plane.

Each E/O material 14 has transparent resistive sheet 16 disposed at or on a first face 17 of the body 102 and a transparent electrode 18 disposed at or on a second face 19 of the body 102. Each element 102 has a control line to each voltage $V_1$ 120, $V_2$ 124, and $V_3$ 122, to apply a $\theta$ angle modifying voltage $V_1$ 120 to transparent resistive sheet 16, a $\varphi$ angle modifying voltage $V_2$ 124 to transparent resistive sheet 156, and a phase-voltage $V_3$ 122 between sheets 16 and 156.

The first two voltages $V_1$ 120 and $V_2$ 124 are preferably common for all elements 102 in the array 100. The phase-voltage $V_3$ 122 is preferably unique to each element 102 depending upon the desired output angles. If all of the voltages $V_1$ 120 and $V_2$ 124 in the array are the same, then one beam is produced. This single beam embodiment may well be the most useful embodiment. On the other hand, if instead half of the voltages $V_1$ 120 and $V_2$ 124 in the array 100 are different than the other half, then two beams may be produced. In this embodiment each beam has a higher divergence than the single beam embodiment. It should be apparent that this may be generalizable to a many beam embodiment and dissimilar beam embodiments, when such embodiments are desired.

Each element 102 may be wired with three control lines 150, 154, and 152 for the three voltages, $V_1$ 120, $V_2$ 124, and $V_3$ 122, respectively, as shown in FIGS. 9, 10 and 11. The orientation of the voltage gradients generated by $V_1$ 120 and $V_2$ 124 are preferably at right angles to each other or orthogonal to each other and orthogonal to the nominal optical axis 110 of the element 102, as shown in FIGS. 10 and 11 of the element 102. The third voltage, $V_3$, 122 is used to adjust the overall phase of the beamlet such that its phase is spatially aligned with its neighbors. This phase-matching process is called "beamforming" in that it combines the array of N×N beamlets 26 from array 100 into a single beam that behaves as if it were emitted from the whole aperture 100. The phase-match is obtained by adjusting voltage $V_3$ 122 until the gap marked $\Delta\phi_n$ 108 in FIG. 12 becomes zero. The gap $\Delta\phi_n$ 108 corresponds to the element-to-element phase mismatch. It changes depending on output angle. In order to 'cohere' a beam, that element-to-element phase mismatch is driven to zero by adjusting the voltage $V_3$ 122.

FIG. 7 shows the elements 102 spaced apart by small gaps 160. Those gaps 160 may be used to run the control wires 150, 154 and 152 for the voltages $V_1$ 120, $V_2$ 124 and $V_3$ 122, respectively, applied to each element 102.

FIG. 12 shows a portion of the two dimensional array 100 of elements 102, shown in FIG. 7, in a side-view with a plane-wave 24 incident from below becoming many beamlets 26 deflected by angle $\theta_n$ (where n refers to the nth ring from the center) 130 and further indicating the phase adjustment $\Delta\phi_n$ 108 that must be made to cohere the beamlets 26 into a single point at a distance f in order to perform as a lens with focal length f. The phase lag between elements is given by Phase Lag=$\Delta\phi_n$=$(8*\pi*s^2/\lambda)*(n-½)/\text{sqrt}(f^2+4n^2s^2)$, but it is only necessary to apply the phase difference within the nearest $2\pi$: Applied Phase Lag=modulo (Phase Lag, $2\pi$). This set of relative phase lags results in a piece-wise approximation to a spherical wavefront converging on a point at distance f, i.e the action of a lens. Each angle $\theta_n$ and phase adjustment $\Delta\phi_n$ is unique to each ring of the structure, set by the desired focal length of the lens assembly.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. A solid state electrically variable focal length lens comprising:
   a plurality of concentric rings of electro-optical material, wherein the electro-optical material comprises any material of a class of hydrogen-doped phase-change metal oxide, and wherein each respective concentric ring further comprises:
   a transparent resistive sheet on a first face of the respective concentric ring, wherein the transparent resistive sheet extends along the first face; and
   a first voltage coupled between a first end and a second end of the transparent resistive sheet;
   wherein the first voltage may be varied to select an optical beam deflection angle.

2. The solid state electrically variable focal length lens of claim 1 wherein:
   the electro-optical material comprises $NdNiO_3$, $SmNiO_3$, $PrNiO_3$, $EuNiO_3$, or $GdNiO_3$, or any combination of $NdNiO_3$, $SmNiO_3$, $PrNiO_3$, $EuNiO_3$, and $GdNiO_3$.

3. The solid state electrically variable focal length lens of claim 1 further comprising:
   a transparent electrode on a second face of the respective concentric ring, wherein the transparent electrode extends along the second face, and wherein the second face is opposite the first face; and
   a second voltage coupled between the first end of the transparent resistive sheet and the transparent electrode;
   wherein the second voltage may be varied to apply a beam forming phase-shift.

4. The solid state electrically variable focal length lens of claim 3 wherein:
   the first voltage and the second voltage are direct current (DC) voltages.

5. The solid state electrically variable focal length lens of claim 1 wherein:
   the first voltage is set for each respective concentric ring so that the solid state electrically variable focal length lens has a desired focal length.

6. The solid state electrically variable focal length lens of claim 1 wherein:
   the first voltage is set for each respective concentric ring so that the solid state electrically variable focal length lens has a focal length at a far focal range; or
   the first voltage is set for each respective concentric ring so that the solid state electrically variable focal length lens has a focal length at a close focal range; or
   the first voltage is set for each respective concentric ring so that the solid state electrically variable focal length lens has a focal length between the far focal range and the close focal range.

7. The solid state electrically variable focal length lens of claim 1 wherein:
a different radial voltage gradient is applied across each respective ring of the plurality of concentric rings so that a radial gradient in the index of refraction steers light toward an optical axis of the solid state electrically variable focal length lens.

8. The solid state electrically variable focal length lens of claim 1 further comprising:
a Fresnel lens coupled to and adjacent to the solid state variable focal length lens;
wherein the Fresnel lens has a plurality of Fresnel rings and wherein each respective Fresnel ring of the plurality of Fresnel rings has a radius matching and aligned to a respective concentric ring of the plurality of concentric rings.

9. The solid state electrically variable focal length lens of claim 8 wherein:
the Fresnel lens has a focal length between a farthest focal length or focus for the solid state variable length lens and a closest focal length or focus to reduce a steering angle for the solid state electrically variable focal length lens.

10. The solid state electrically variable focal length lens of claim 1:
wherein the solid state electrically variable focal length lens operates in transmission; or
wherein the solid state electrically variable focal length lens further comprises:
a mirror on the first face of the respective concentric ring;
wherein the solid state electrically variable focal length lens operates in reflection.

11. The solid state electrically variable focal length lens of claim 1:
wherein the plurality of concentiric rings are arranged adjacent to one another in a radial direction.

12. A solid state zoom lens comprising:
a first plurality of first concentric rings of first electro-optical material, wherein the first electro-optical material comprises any material of a class of hydrogen-doped phase-change metal oxide, and wherein each respective first concentric ring further comprises:
a first transparent resistive sheet on a first face of the respective first concentric ring, wherein the first transparent resistive sheet extends along the first face; and
a first voltage coupled between a first end and a second end of the first transparent resistive sheet; and
wherein the first voltage may be varied to select a beam deflection angle; and
a second plurality of second concentric rings of second electro-optical material, wherein the second electro-optical material comprises any material of a class of hydrogen-doped phase-change metal oxide and wherein each respective second concentric ring further comprises:
a second transparent resistive sheet on a first face of the respective second concentric ring, wherein the second transparent resistive sheet extends along the first face; and
a second voltage coupled between a first end and a second end of the second transparent resistive sheet;
wherein the second voltage may be varied to select a beam deflection angle; and
wherein the first plurality of first concentric rings is optically coupled to the second plurality of second concentric rings.

13. The solid state zoom lens of claim 12 further comprising:
a first transparent electrode on a second face of the respective first concentric ring, wherein the first transparent electrode extends along the second face, and wherein the second face is opposite the first face; and
a third voltage coupled between the first end of the first transparent resistive sheet and the first transparent electrode;
wherein the third voltage may be varied to apply a beam forming phase-shift.

14. The solid state zoom lens of claim 12 further comprising:
a second transparent electrode on a second face of the respective second concentric ring, wherein the second transparent electrode extends along the second face, and wherein the second face is opposite the first face; and
a fourth voltage coupled between the first end of the second transparent resistive sheet and the second transparent electrode;
wherein the fourth voltage may be varied to apply a beam forming phase-shift.

15. The solid state zoom lens of claim 12 wherein:
a distance between the first plurality of concentric rings and the second plurality of concentric rings is the sum of a far focal length for the first plurality of concentric rings and a near focal length for the second plurality of concentric rings; or
a distance between the first plurality of concentric rings and the second plurality of concentric rings is the sum of a near focal length for the first plurality of concentric rings and a far focal length for the second plurality of concentric rings.

16. The solid state zoom lens of claim 12 further comprising:
a solid state optical tip-tilt-phased element optically coupled to the second plurality of concentric rings to provide a solid state pan-tilt-zoom "gimbal" with no moving parts.

17. The solid state zoom lens of claim 16 wherein the solid state optical tip-tilt-phased element further comprises:
a body of electro-optical material, wherein the body of electro-optical material comprises any material of a class of hydrogen-doped phase-change metal oxide;
a third transparent resistive sheet on a first face of the body of electro-optical material, wherein the third transparent resistive sheet extends along the first face; and
a fourth transparent resistive sheet on a second face of the body of electro-optical material, wherein the fourth transparent resistive sheet extends along the second face, and wherein the second face is opposite the first face;
a third voltage coupled between a first end and a second end of the third transparent resistive sheet; and
a fourth voltage coupled between a first end and a second end of the fourth transparent resistive sheet;
wherein the first end and the second end of the third transparent resistive sheet are opposite each other;
wherein the first end and the second end of the fourth transparent resistive sheet are opposite each other;
wherein the third voltage biases the third transparent resistor sheet in a first direction; and
wherein the fourth voltage biases the fourth transparent resistor sheet in a second direction.

18. The solid state zoom lens of claim 17 wherein the second direction is orthogonal to the first direction.

19. The solid state zoom lens of claim 17 wherein the third voltage and the fourth voltage are direct current (DC) voltages.

20. The solid state zoom lens of claim 12 comprising:
wherein the first plurality of first concentric rings are arranged adjacent to one another in a first radial direction; and
wherein the second plurality of second concentric rings are arranged adjacent to one another in a second radial direction.

21. A method of providing a solid state electrically variable focal length lens comprising:
providing a plurality of concentric rings of electro-optical material, wherein the electro-optical material comprises any material of a class of hydrogen-doped phase-change metal oxide and wherein providing each respective concentric ring further comprises:
providing a transparent resistive sheet on a first face of the respective concentric ring, wherein the transparent resistive sheet extends along the first face; and
providing a first voltage coupled between a first end and a second end of the transparent resistive sheet;
wherein the first voltage may be varied to select a optical beam deflection angle.

22. The method of claim 21 wherein:
the electro-optical material comprises $NdNiO_3$, $SmNiO_3$, $PrNiO_3$, $EuNiO_3$, or $GdNiO_3$, or any combination of $NdNiO_3$, $SmNiO_3$, $PrNiO_3$, $EuNiO_3$, and $GdNiO_3$.

23. The method of claim 21 further comprising:
providing a Fresnel lens coupled to and adjacent to the solid state variable length lens;
wherein the Fresnel lens has a plurality of Fresnel rings and wherein each respective Fresnel ring of the plurality of Fresnel rings has a radius matching and aligned to a respective concentric ring of the plurality of concentric rings.

24. The method of claim 21:
wherein the plurality of concentric rings of electro-optical material are arranged adjacent to one another in a radial direction.

25. A method of providing a solid state zoom lens comprising:
providing a first plurality of first concentric rings of first electro-optical material, wherein the first electro-optical material comprises any material of a class of hydrogen-doped phase-change metal oxide, and wherein providing each respective first concentric ring further comprises:
providing a first transparent resistive sheet on a first face of the respective first concentric ring, wherein the first transparent resistive sheet extends along the first face; and
providing a first voltage coupled between a first end and a second end of the first transparent resistive sheet; and
wherein the first voltage may be varied to select a beam deflection angle; and
providing a second plurality of second concentric rings of second electro-optical material, wherein the second electro-optical material comprises any material of a class of hydrogen-doped phase-change metal oxide, and wherein providing each respective second concentric ring further comprises:
providing a second transparent resistive sheet on a first face of the respective second concentric ring, wherein the second transparent resistive sheet extends along the first face; and
providing a second voltage coupled between a first end and a second end of the second transparent resistive sheet;
wherein the second voltage may be varied to select a beam deflection angle; and
wherein the first plurality of concentric rings are optically coupled to the second plurality of concentric rings.

26. The method of claim 25 wherein:
the first electro-optical material comprises $NdNiO_3$, $SmNiO_3$, $PrNiO_3$, $EuNiO_3$, or $GdNiO_3$, or any combination of $NdNiO_3$, $SmNiO_3$, $PrNiO_3$, $EuNiO_3$, and $GdNiO_3$; and
the second electro-optical material comprises $NdNiO_3$, $SmNiO_3$, $PrNiO_3$, $EuNiO_3$, or $GdNiO_3$, or any combination of $NdNiO_3$, $SmNiO_3$, $PrNiO_3$, $EuNiO_3$, and $GdNiO_3$.

27. The method of claim 25 further comprising:
providing a solid state optical tip-tilt-phased element optically coupled to the second plurality of concentric rings to provide a solid state pan-tilt-zoom "gimbal" with no moving parts.

28. The method of claim 27 wherein providing the solid state optical tip-tilt-phased element further comprises:
providing a body of electro-optical material, wherein the body of electro-optical material comprises any material of a class of hydrogen-doped phase-change metal oxide;
providing a third transparent resistive sheet on a first face of the body of electro-optical material, wherein the third transparent resistive sheet extends along the first face; and
providing a fourth transparent resistive sheet on a second face of the body of electro-optical material, wherein the fourth transparent resistive sheet extends along the second face, and wherein the second face is opposite the first face;
providing a third voltage coupled between a first end and a second end of the third transparent resistive sheet; and
providing a fourth voltage coupled between a first end and a second end of the fourth transparent resistive sheet;
wherein the first end and the second end of the third transparent resistive sheet are opposite each other;
wherein the first end and the second end of the fourth transparent resistive sheet are opposite each other;
wherein the third voltage biases the third transparent resistor sheet in a first direction;
wherein the fourth voltage biases the fourth transparent resistor sheet in a second direction; and
wherein the second direction is orthogonal to the first direction.

29. The method of claim 25:
wherein the first plurality of first concentric rings are arranged adjacent to one another in a first radial direction; and
wherein the second plurality of second concentric rings are arranged adjacent to one another in a second radial direction.

* * * * *